United States Patent
Kokubo (10) Patent No.: US 9,707,832 B2
(45) Date of Patent: Jul. 18, 2017

(54) SUNROOF APPARATUS

(71) Applicant: AISIN SEIKI KABUSHISIKI KAISHA, Kariya-shi, Aichi-ken (JP)

(72) Inventor: Yusuke Kokubo, Atsugi (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 15/219,774

(22) Filed: Jul. 26, 2016

(65) Prior Publication Data
US 2017/0028827 A1    Feb. 2, 2017

(30) Foreign Application Priority Data
Jul. 30, 2015   (JP) ................. 2015-150907

(51) Int. Cl.
*B60J 7/043* (2006.01)
*B60J 7/02* (2006.01)
*B60J 7/057* (2006.01)

(52) U.S. Cl.
CPC .......... *B60J 7/043* (2013.01); *B60J 7/02* (2013.01); *B60J 7/024* (2013.01); *B60J 7/0573* (2013.01)

(58) Field of Classification Search
CPC ..... B60J 7/05; B60J 7/053; B60J 7/043; B60J 7/0573
USPC ..... 296/216.08; 312/334, 44, 334.45, 334.46
See application file for complete search history.

(56) References Cited

U.S. PATENT DOCUMENTS

| | | | | |
|---|---|---|---|---|
| 4,732,422 A | * | 3/1988 | Schlapp | B60J 7/05 296/221 |
| 6,224,147 B1 | * | 5/2001 | Farber | B60J 7/022 296/187.04 |
| 6,390,545 B1 | | 5/2002 | Makino et al. | |
| 6,467,838 B2 | | 10/2002 | Hirata | |
| 8,985,683 B2 | * | 3/2015 | Kikuchi | B60J 7/0435 296/216.03 |
| 2003/0151275 A1 | * | 8/2003 | Ohnishi | B60J 7/05 296/216.08 |
| 2012/0049584 A1 | * | 3/2012 | Manders | B60J 7/0573 296/223 |

FOREIGN PATENT DOCUMENTS

| | | |
|---|---|---|
| JP | 2002-154329 | 5/2002 |
| JP | 4244472 | 3/2009 |
| JP | 4432211 | 3/2010 |

* cited by examiner

*Primary Examiner* — Dennis H Pedder
(74) *Attorney, Agent, or Firm* — Finnegan, Henderson, Farabow, Garrett & Dunner, LLP (57) ABSTRACT

A sunroof apparatus includes: a movable panel adapted to open and close an opening formed in a roof; a guide rail provided in each edge portion of the opening in a width direction, extending in a forward and rearward direction, and including a front end portion in which an attachment hole is formed to open in a vertical direction; a guide block capable of limiting the movement of the movable panel in the forward and rearward direction, and including a body portion mounted in a circumferential edge portion of the attachment hole, a rear limited portion protruding downward from a rear end portion of the body portion, and a front limited portion protruding downward from a front end portion of the body portion; and a holding member tightened to the guide rail, and including a front limiting portion.

5 Claims, 5 Drawing Sheets

INSIDE OF VEHICLE ⟵⟶ OUTSIDE OF VEHICLE
WIDTH
DIRECTION

SUNROOF APPARATUS

CROSS REFERENCE TO RELATED APPLICATIONS

This application is based on and claims priority under 35 USC. §119 to Japanese Patent Application 2015-150907, filed on Jul. 30, 2015, the entire contents of which are incorporated herein by reference.

TECHNICAL FIELD

This disclosure relates to a sunroof apparatus.

BACKGROUND DISCUSSION

In the related art, various types of sunroof apparatuses are proposed (for example, refer to JP 2002-154329A (Reference 1), Japanese Patent No. 4244472 (Reference 2), and Japanese Patent No. 4432211 (Reference 3)). Each of the sunroof apparatuses includes a guide block that limits the movement of a movable panel in a forward and rearward direction of a vehicle during a tilt operation of the movable panel.

In each of the sunroof apparatuses, the fixing of the guide block to a guide rail is described, but a specific fixing structure is not described at all: In contrast, since a substantial load is applied to the guide block from a movable panel side when the movement of the movable panel is limited, desirably, the guide block is rigidly fixed to the guide rail or the like.

SUMMARY

Thus, a need exists for a sunroof apparatus which is not susceptable to the drawback mentioned above.

A sunroof apparatus according to an aspect of this disclosure includes: a movable panel adapted to open and close an opening formed in a roof of a vehicle; a guide rail that is provided in each edge portion of the opening in a width direction of the vehicle, extends in a forward and rearward direction, and includes a front end portion in which an attachment hole is formed in such a way as to open in a vertical direction of the vehicle; a guide block that is capable of limiting the movement of the movable panel in the forward and rearward direction of the vehicle, and includes a body portion mounted in a circumferential edge portion of the attachment hole, a rear limited portion which protrudes downward from a rear end portion of the body portion in the vertical direction of the vehicle, and interposes a rear edge portion of the attachment hole between the body portion and the rear limited portion in the vertical direction of the vehicle, and a front limited portion which protrudes downward from a front end portion of the body portion in the vertical direction of the vehicle, and is inserted into the attachment hole; and a holding member that is tightened to the guide rail, and includes a front limiting portion which is in contact with or is proximate to a vehicle front side of the front limited portion.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment of a sunroof apparatus will be described. Hereinafter, a "forward and rearward direction" refers to a forward and rearward direction of a vehicle. An "upper side" and a "lower side" respectively refer to an upper side and a lower side of the vehicle in a vertical direction of the vehicle. In addition, a "vehicle interior side" refers to the inside of the vehicle in a width direction of the vehicle, which indicates a passenger compartment side. A "vehicle exterior side" refers to the outside of the vehicle in the width direction, which is closer to the outside of the passenger compartment.

Figure 1:
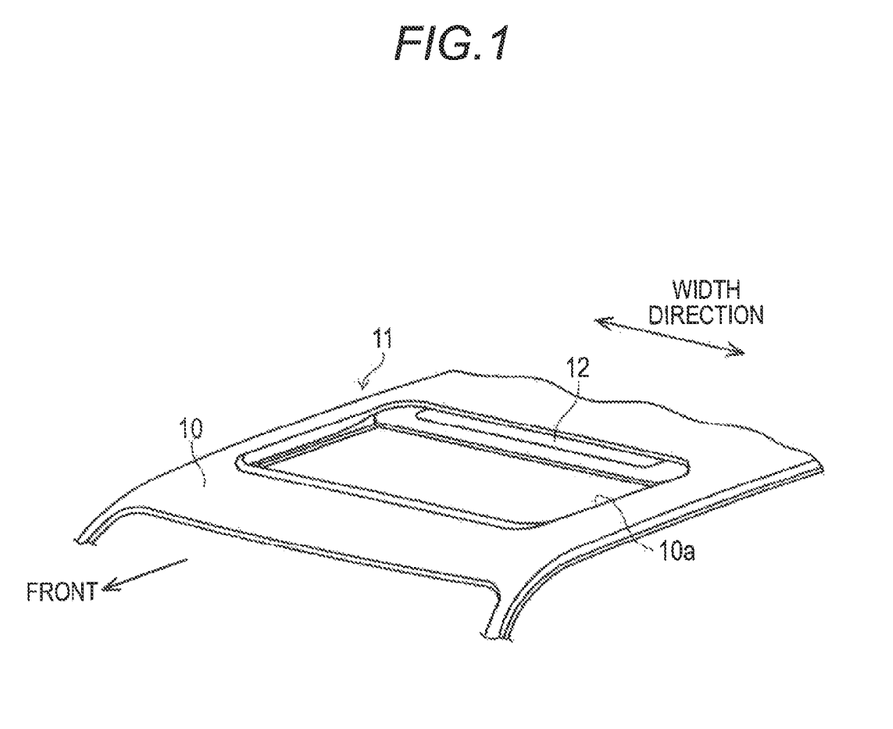
FIG. 1 is a perspective view illustrating the structure of a sunroof apparatus in an embodiment.

As illustrated in FIG. 1, a substantially rectangular opening 10a is formed in a roof 10 of a vehicle such as an automobile, and a sunroof apparatus 11 is mounted on the roof 10. The sunroof apparatus 11 includes a substantially rectangular movable panel 12 made of a glass plate or the like which opens and closes the opening 10a by moving in the forward and rearward direction.

The movable panel 12 is attached such that the movable panel 12 can be tilted upward, specifically, a rear portion of the movable panel 12 moves upward in such a way as to turn around a front portion of the movable panel 12 in one direction, the movable panel 12 can be tilted downward, specifically, the rear portion moves downward in such a way as to turn around the front portion in the other direction, or the movable panel 12 can be slid in the forward and rearward direction. The movable panel 12 is slid while being kept in a tilt-down state during the opening and closing of the movable panel 12, that is, a so-called inner sliding type is adopted.

Figure 2:
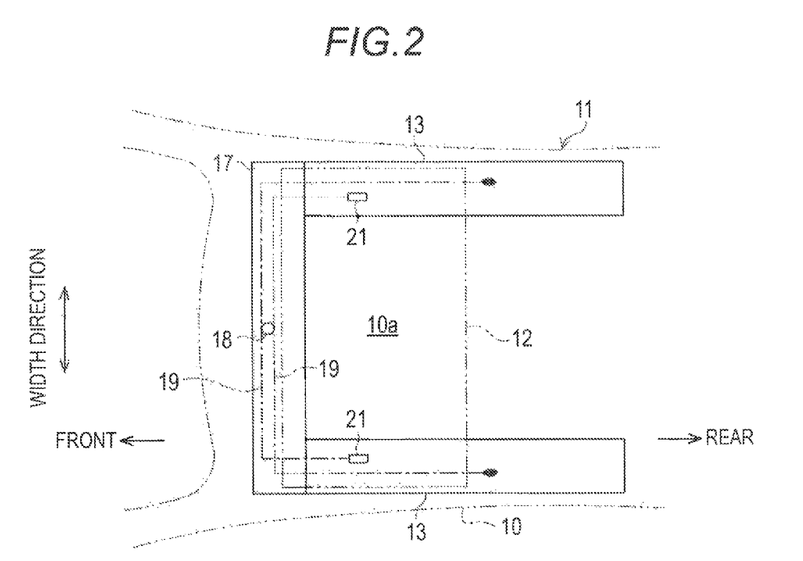
FIG. 2 is a top view illustrating the structure of the sunroof apparatus in the embodiment.

As illustrated in FIG. 2, a pair of guide rails 13 are respectively disposed in both side edge portions of the opening 10a in the width direction of the vehicle. Each of the guide rails 13 is made of an extruded aluminum alloy or the like, and extends in the forward and rearward direction while having a uniform cross-section in a longitudinal direction of the guide rail 13. Sliding members 21 are respectively guided and supported by the guide rails 13 such that the sliding members 21 are capable of moving in the forward and rearward direction. Both side edge portions of the movable panel 12 in the width direction of the vehicle are respectively linked to and supported by both the sliding members 21 in a state where the movable panel 12 is bridged therebetween.

A front side edge portion of the opening 10a is provided with a front housing 17 through which front end portions of both the guide rails 13 are connected to each other in the width direction of the vehicle. An electric drive source 18 such as an electric motor with an output gear is installed in a longitudinal middle portion of the front housing 17. The electric drive source 18 is connected to both the sliding members 21 via a pair of belt-shaped drive belts 19 made of resin or the like. The electric drive source 18 simultaneously drives the movement of the sliding members 21 in the forward and rearward direction. As the sliding members 21 move along the guide rails 13 in the forward and rearward direction, the movable panel 12 is tilted upward, is tilted downward, or is slid.

Figure 3:
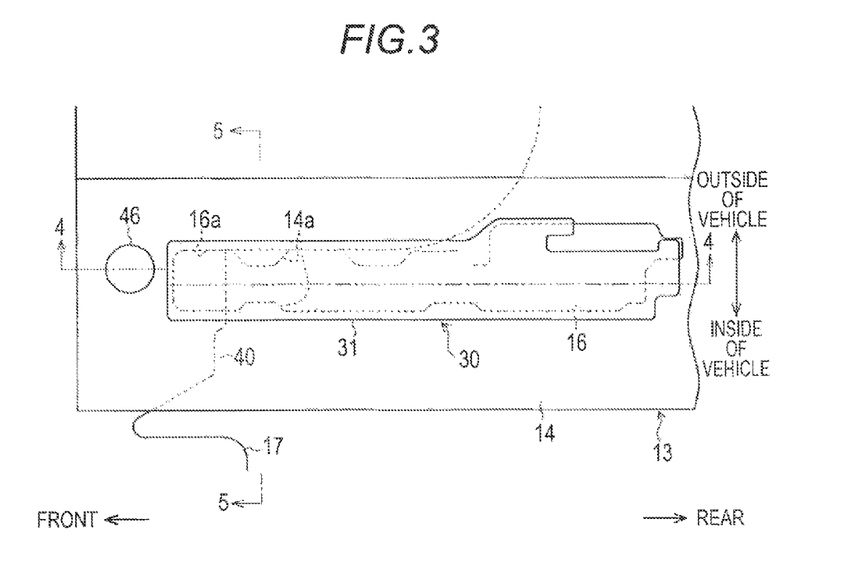
FIG. 3 is a simplified top view illustrating the structure of the sunroof apparatus in the embodiment.
Figure 5:
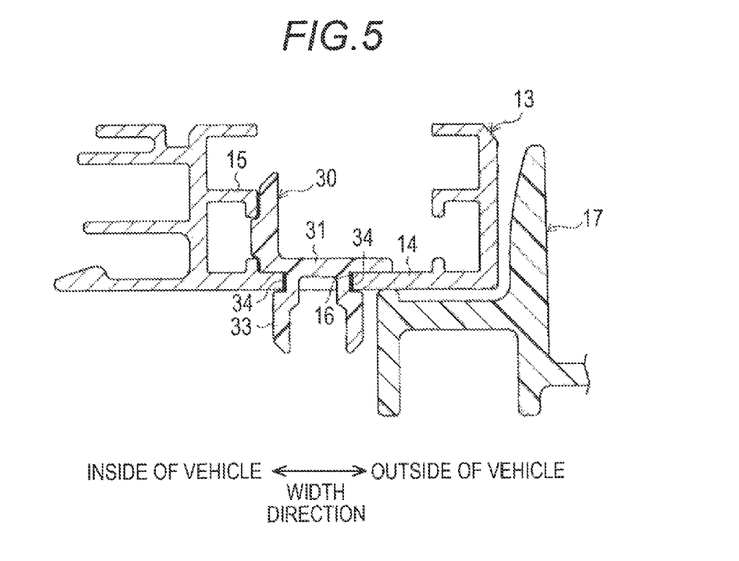
FIG. 5 is a sectional view taken along line 5-5 in FIG. 3.

As illustrated in FIG. 3, a guide block 30 made of resin or the like is attached to the front end portion of each of the guide rails 13. That is, as illustrated in FIG. 5, the guide rail 13 includes a substantially long rail portion 14 that extends in the forward and rearward direction (direction perpendicular to the sheet of the drawing), and a belt guide portion 15 having a substantially C-shaped cross-section which is formed in a vehicle interior side portion of the guide rail 13 in conjunction with the rail portion 14, while opening toward the vehicle exterior side. The rail portion 14 supports the sliding member 21 in an area closer to the rear of the vehicle than the guide block 30, such that the sliding member 21 is capable of moving in the forward and rearward direction. The belt guide portion 15 guides the movement of a drive belt 19 in the forward and rearward direction. An attachment hole 16 is formed in a front end portion of the rail portion 14, and opens in the vertical direction of the vehicle. As illustrated in FIG. 3, the attachment hole 16 extends in the forward and rearward direction while the opening width of the attachment hole 16 changes in the width direction of the vehicle. An insertion hole 16a is formed by relatively enlarging the opening of a front end portion of the attachment hole 16 in the width direction of the vehicle. A pair of fitted pieces 14a protruding toward each other are formed in the rail portion 14 such that the pair of fitted pieces 14a are positioned closer to the rear of the vehicle than the insertion hole 16a, and the opening width of the attachment hole 16 in the width direction of the vehicle is reduced.

Figure 4:
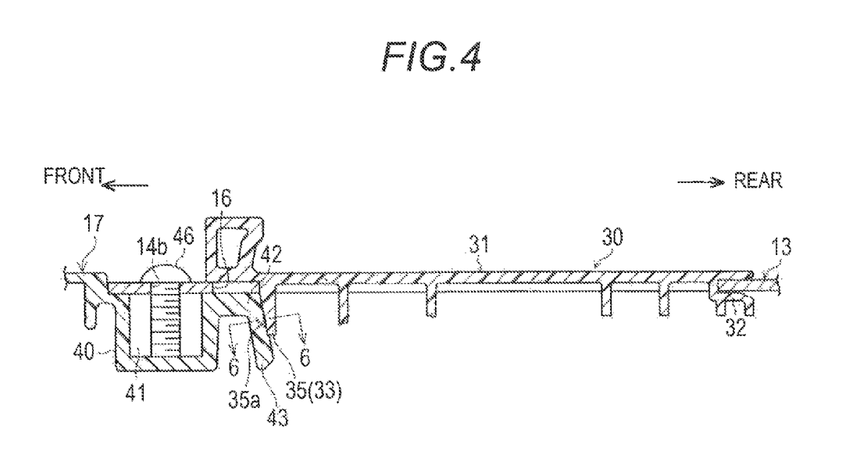
FIG. 4 is a sectional view taken along line 4-4 in FIG. 3.

The guide block 30 includes a body portion 31 which basically has dimensions greater than the opening widths of the attachment hole 16 in the width direction and the forward and rearward direction of the vehicle, and which is mounted on a circumferential edge portion of the attachment hole 16. As illustrated in FIG. 4, the guide block 30 includes a rear limited portion 32 having a substantially L-shaped cross-section which protrudes downward from a rear end portion of the body portion 31, and interposes a rear edge portion of the attachment hole 16 between the rear limited portion 32 and the body portion 31 in the vertical direction of the vehicle. The guide block 30 positions the rear edge portion of the attachment hole 16 in the vertical direction of the vehicle, and limits the movement of the rear edge portion of the attachment hole 16 toward the rear of the vehicle by interposing the rear edge portion of the attachment hole 16 between the body portion 31 and the rear limited portion 32 in the vertical direction.

Figure 6:
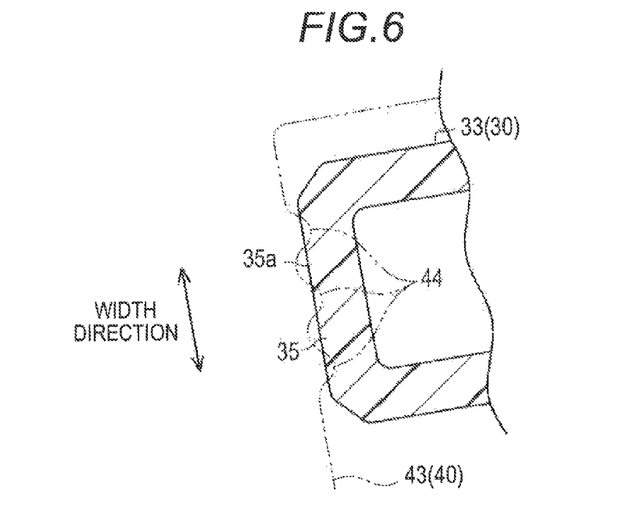
FIG. 6 is a sectional view taken along line 6-6 in FIG. 4.

As illustrated in FIGS. 4 to 6, the guide block 30 includes a substantially frame-shaped protrusion portion 33 which protrudes downward from a front end portion of the body portion 31, and is inserted into the attachment hole 16. The dimension of the protrusion portion 33 in the width direction of the vehicle is basically set to be smaller than the opening width of the insertion hole 16a in the width direction, and to be larger than a separation distance (opening width of the attachment hole 16 in the width direction at the position of the fitted pieces 14a in the forward and rearward direction) between both the fitted pieces 14a in the width direction.

Figure 8:
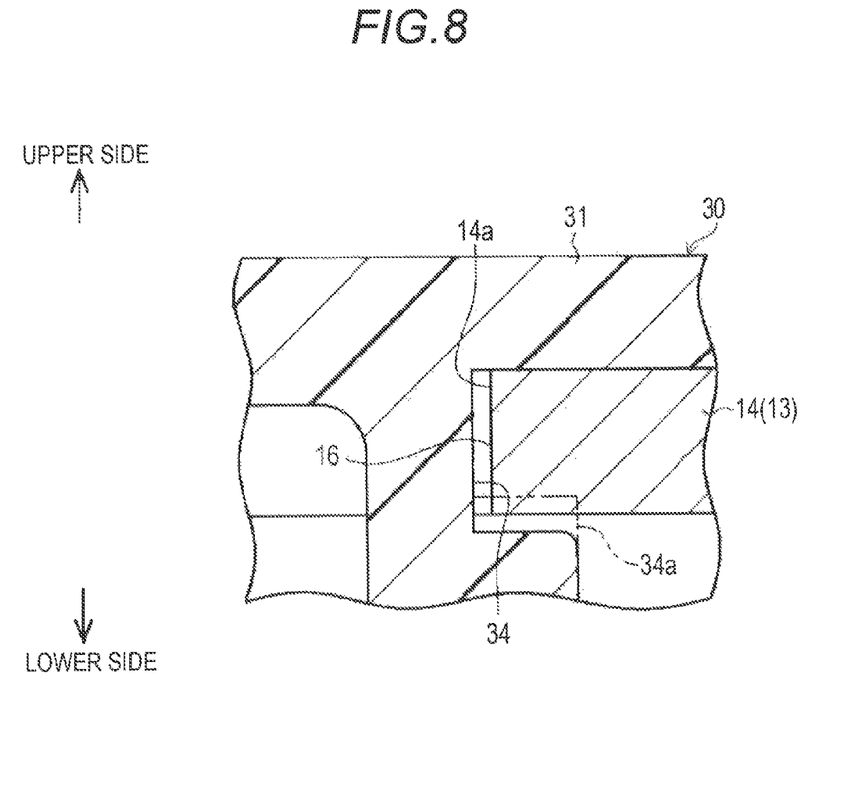
FIG. 8 is an enlarged view.

A pair of fitting grooves 34 having a substantially U-shaped cross-section and acting as fitting portions are formed in a base end portion of the protrusion portion 33 connected to the body 31, and are recessed toward each other such that the dimension of the base end portion is smaller than the separation distance between both the fitted pieces 14a in the width direction of the vehicle. The opening width of each of the fitting grooves 34 in the vertical direction of the vehicle is set to be slightly larger than the plate thickness of the rail portion 14. Since both the fitted pieces 14a are respectively fitted into both the fitting grooves 34, the guide block 30 is positioned relative to the rail portion 14 (guide rail 13) in the width direction and the vertical direction of the vehicle (limit directions other than the forward and rearward direction of the vehicle). Particularly, as illustrated in FIG. 8, a rib 34a protrudes upward from a lower inner wall surface of each of the fitting grooves 34, and extends in the width direction of the vehicle in the range of the lower inner wall surface in the width direction. In a state where the fitted piece 14a is fitted into the fitting groove 34, a tip end portion of the rib 34a is in contact (press contact) with a lower surface of the fitted piece 14a while being squeezed. As a result, fitting between the fitting groove 34 and the fitted pieces 14a is more stabilized. As illustrated in FIG. 4, a front portion of the protrusion portion 33 forms a front limited portion 35. A front end surface of the front limited portion 35 forms an inclined surface 35a that approaches the rear of the vehicle as extending downward.

Figure 7A:
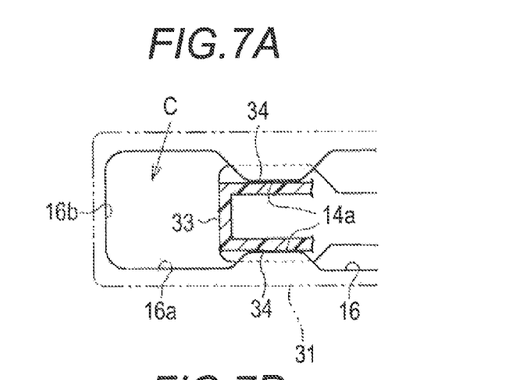
FIG. 7A is a simplified top view illustrating a partial broken-out section of a guide block and a guide rail of the sunroof apparatus of the embodiment which are fitted together.
Figure 7B:
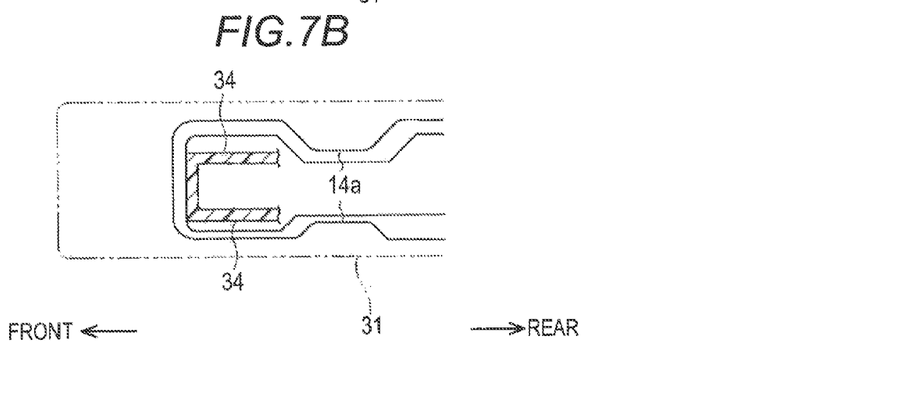
FIG. 7B is a simplified top view illustrating a partial broken-out section of the guide block and the guide rail, the fitting of which is released.

As illustrated in FIG. 7A, a gap C is formed between an inner wall surface 16b of a front end of the insertion hole 16a (attachment hole 16) and the inclined surface 35a (front end surface of the protrusion portion 33) of the front limited portion 35 in the forward and rearward direction such that the gap C is equivalent to at least the range of a margin of engagement between the rear edge portion of the attachment hole 16 and the rear limited portion 32. As illustrated in FIG. 7B, in a state where the guide block 30 is positioned close to the front of the vehicle relative to the guide rail 13 by a distance of the gap C, fitting between both the fitting grooves 34 and both fitted pieces 14a is released. Therefore, when the guide block 30 is attached to the guide rail 13, if the guide block 30 is positioned close to the front of the vehicle relative to the guide rail 13 by a distance of the gap C, while interference between the attachment hole 16 and the rear limited portion 32 and between the attachment hole 16 and the protrusion portion 33 is avoided, the rear limited portion 32 and the protrusion portion 33 (front limited portion 35) can be inserted into the attachment hole 16 until the body portion 31 is mounted on the circumferential edge portion of the attachment hole 16. If the guide block 30 in this state is moved toward the rear of the vehicle, the rear edge portion is interposed between the body portion 31 and the rear limited portion 32 in the vertical direction of the vehicle, and both the fitting pieces 14a are respectively fitted into both the fitting grooves 34.

The guide block 30 forms a portion of a check mechanism (not illustrated) that limits a front end portion of the movable panel 12, which is the center of turning when the movable panel 12 is tilted, from moving in the forward and rearward direction. The check mechanism is configured to release limitation to the movement of the front end portion toward the rear of the vehicle when the movable panel 12 is opened while being in a tilt-down state, or to limit the turning of the movable panel 12 (that is, the tilt operation of the movable panel 12) around the front end portion when the movable panel 12 is closed while being in a tilt-down state.

As illustrated in FIG. 5, the body portion 31 is in contact with or is approximate to the vehicle exterior side of the belt guide portion 15. The reason for this is to receive a load, which is applied from the movable panel 12 when the movement of the movable panel 12 is limited, via collaboration between the body portion 31 and the belt guide portion 15.

As illustrated in FIGS. 3 and 4, a holding portion 40 is integrally formed in a tip end portion of the front housing 17, and acts as a holding member that receives the front end portions of the guide rails 13 from the lower side, The front housing 17 is tightened to the guide rails 13 via the holding portions 40. That is, a bolt insertion hole 14b having a substantially circular shape or a substantially oval shape is formed in the rail portion 14 of the guide rail 13 such that the bolt insertion hole 14b is positioned closer to the front of the vehicle than the attachment hole 16, and opens in the vertical direction of the vehicle. A nut portion 41 protrudes downward from the holding portion 40 at the position of the bolt insertion hole 14b. The holding portion 40 (front housing 17) is tightened to the rail portion 14 (guide rail 13) by fastening a screw portion of a bolt 46, which is inserted into the bolt insertion hole 14b from the upper side, to the nut portion 41.

Each of the holding portions 40 includes an extension portion 42 that extends along a lower surface of the rail portion 14 from a rear end of the nut portion 41 toward the rear of the vehicle, and a front limiting portion 43 that extends downward along the inclined surface 35a of the front limited portion 35 from a rear end of the extension portion 42 toward the rear of the vehicle. Since the front limiting portion 43 is in contact with or is proximate to a vehicle front side of the front limited portion 35, the movement of the guide block 30 toward the front of the vehicle is limited.

As illustrated in FIG. 6, multiple (for example, three) ribs 44 protrude from a front end surface of the front limiting portion 43 toward the inclined surface 35a, and extend in an inclination direction of the front end surface. The ribs 44 are disposed in the width direction of the vehicle while being spaced regularly, and are in contact (press contact) with the inclined surface 35a in a state where tip end portions of the ribs 44 are squeezed. Therefore, the front limiting portion 43 more stably limits the movement of the front limited portion 35 (guide block 30).

As described above in detail, according to the embodiment, it is possible to obtain the following operational effects.

(1) In the embodiment, since the rear edge portion of the attachment hole 16 is interposed between the body portion 31 and the rear limited portion 32 in the vertical direction of the vehicle, the movement of the guide block 30 toward the rear of the vehicle is limited. Since the front limiting portion 43 of the holding portion 40 (front housing 17) tightened to the guide rail 13 is in contact with or is proximate to the front limited portion 35, the movement of the guide block 30 toward the front of the vehicle is limited. As such, it is possible to more rigidly fix the guide block 30 by limiting the movement of the guide block 30 relative to the guide rail 13 in the forward and rearward direction.

(2) In the embodiment, since both the fitted pieces 14a (inner wall surface of the attachment hole 16) are respectively fitted into both the fitting grooves 34, the movement of the guide block 30 relative to the guide rail 13 in the width direction and the vertical direction (limit directions) of the vehicle is limited. As a result, it is possible to more rigidly fix the guide block 30. In a state where the guide block 30 is positioned close to the front of the vehicle relative to the guide rail 13 by a distance of the gap C, based on the assumption that the holding portion 40 is in an untightened state, fitting between both the fitting grooves 34 and both the fitted pieces 14a is released, and there is no margin of engagement between the rear edge portion of the attachment hole 16 and the rear limited portion 32. As a result, it is possible to attach (or detach from) the guide block 30 to the attachment hole 16 while avoiding interference therebetween. That is, when the guide block 30 is attached to the attachment hole 16, the body portion 31 is mounted on the circumferential edge portion of the attachment hole 16 while the rear limited portion 32 and the front limited portion 35 (protrusion portion 33) are inserted into the attachment hole 16 in a state where the guide block 30 is positioned close to the front of the vehicle relative to the guide rail 13 by a distance of the gap C. The guide block 30 in this state is moved toward the rear of the vehicle, the rear edge portion of the attachment hole 16 is interposed between the body portion 31 and the rear limited portion 32 in the vertical direction of the vehicle, and both the fitting grooves 34 are respectively fitted into both the fitted pieces 14a. Thereafter, if the holding portion 40 (front housing 17) is tightened to the guide rail 13, the front limiting portion 43 is in contact with or is proximate to the front limited portion 35. In this manner, it is possible to limit the movement of the guide block 30 relative to the guide rail 13 in the forward and rearward direction and the limit directions (the width direction and the vertical direction of the vehicle).

(3) In the embodiment, since the ribs 44 are in contact with the front limited portion 35 while being squeezed, the front limiting portion 43 presses the front limited portion 35 such that the guide block 30 moves toward the rear of the vehicle, that is, such that the margin of engagement between the rear edge portion of the attachment hole 16 and the rear limited portion 32 is maximized. As a result, it is possible to more rigidly limit the movement (wobbling) of the guide block 30 relative to the guide rail 13 in the forward and rearward direction, independent of variations in the dimensions of the guide block 30.

(4) In the embodiment, since both the fitting grooves 34 respectively are in contact with or are proximate to both the fitted pieces 14a in the width direction of the vehicle, the movement of the guide block 30 in the width direction is limited. Since both the fitted pieces 14a are respectively interposed in both the fitting grooves 34 in the vertical direction of the vehicle, the movement of the guide block 30 in the vertical direction is limited. As such, it is possible to more rigidly fix the guide block 30 by limiting the movement of the guide block 30 relative to the guide rail 13 in the width direction and the vertical direction of the vehicle via fitting between both the fitted pieces 14a and both the fitting grooves 34.

(5) In the embodiment, since both the holding portions 40 disposed in both guide rails 13 are formed integrally with the front housing 17, it is possible to prevent an increase in the number of components. In other words, it is possible to fix the guide block 30 via the existing front housing 17 tightened to the guide rails 13. For this reason, dedicated tightening tools (for example, bolts) for fixing the guide blocks 30 to the guide rails 13 are not required, and thus, it is possible to reduce the costs of components such as tightening tools, and an assembly cost.

(6) In the embodiment, since contact portions of the front limited portion 35 and the front limiting portion 43 are inclined relative to the vertical direction of the vehicle, it is possible to generate a component force to press the guide block 30 toward the rear of the vehicle when the guide rail 13 and the holding portion 40 (the front housing 17) are tightened together in the vertical direction via the bolt 46. As a result, it is possible to more rigidly limit the movement of the guide block 30 relative to the guide rail 13 in the forward and rearward direction.

(7) In the embodiment, in a state where the fitted piece 14a is fitted into the fitting groove 34, the tip end portion of the rib 34a is in contact (press contact) with the lower surface of the fitted piece 14a while being squeezed. As a result, it is possible to more stabilize fitting between the fitting groove 34 and the fitted piece 14a, and for example, it is possible to prevent the wobbling of the guide block 30 relative to the guide rail 13 in the vertical direction of the vehicle, The following changes may be made to the embodiment.

In the embodiment, a rib (34a) may protrude downward from an upper inner wall surface (lower surface of the body portion 31) of each of the fitting groove 34. The rib 34a of the fitting groove 34 may be omitted.

In the embodiment, the front limited portion 35 and the like may extend in the vertical direction of the vehicle without being inclined.

In the embodiment, the holding portion (holding member) 40 may be a dedicated component separate from the front housing 17.

In the embodiment, the ribs 44 of the front limiting portion 43 may be omitted. Ribs equivalent to the ribs 44 may protrude from the inclined surface 35a of the front limited portion 35 toward a rear end surface of the front limiting portion 43.

In the embodiment, the movement of the guide block 30 relative to the guide rail 13 via fitting between the attachment hole and the fitting portions (both the fitted pieces 14a and both the fitting grooves 34) may be limited in only one direction (the width direction or the vertical direction of the vehicle) other than the forward and rearward direction.

In the embodiment, the sunroof apparatus may be an outer sliding type sunroof apparatus in which the movable panel 12 is opened while being kept in a tilt-up state. Hereinafter, a technical concept which persons skilled in the art can ascertain from the embodiment and the separate examples will be additionally described.

(A) A sunroof apparatus according to an aspect of this disclosure includes; a movable panel adapted to open and close an opening formed in a roof of a vehicle; a guide rail that is provided in each edge portion of the opening in a width direction of the vehicle, extends in a forward and rearward direction, and includes a front end portion in which an attachment hole is formed in such a way as to open in a vertical direction of the vehicle; a guide block that is capable of limiting the movement of the movable panel in the forward and rearward direction of the vehicle, and includes a body portion mounted in a circumferential edge portion of the attachment hole, a rear limited portion which protrudes downward from a rear end portion of the body portion in the vertical direction of the vehicle, and interposes a rear edge portion of the attachment hole between the body portion and the rear limited portion in the vertical direction of the vehicle, and a front limited portion which protrudes downward from a front end portion of the body portion in the vertical direction of the vehicle, and is inserted into the attachment hole; and a holding member that is tightened to the guide rail, and includes a front limiting portion which is in contact with or is proximate to a vehicle front side of the front limited portion.

With this configuration, since the rear edge portion of the attachment hole is interposed between the body portion and the rear limited portion in the vertical direction of the vehicle, the movement of the guide block toward the rear of the vehicle is limited. Since the front limiting portion of the holding member tightened to the guide rail is in contact with or is proximate to the front limited portion, the movement of the guide block toward the front of the vehicle is limited. As such, it is possible to more rigidly fix the guide block by limiting the movement of the guide block relative to the guide rail in the forward and rearward direction of the vehicle.

(B) In the sunroof apparatus, a gap is formed between the attachment hole and the front limited portion in the forward and rearward direction of the vehicle such that the gap is equivalent to at least the range of a margin of engagement between the rear edge portion of the attachment hole and the rear limited portion, and the guide block includes a fitting portion which limits the movement of the guide block relative to the guide rail in a limit direction other than the forward and rearward direction of the vehicle by being fitted into the attachment hole, and is capable of releasing fitting between the guide block and the attachment hole in a state where the fitting portion is positioned close to the front of the vehicle relative to the guide rail by a distance of the gap.

With this configuration, since the fitting portion is fitted into the attachment hole, the movement of the guide block relative to the guide rail in the limit direction is limited. As a result, it is possible to more rigidly fix the guide block. In a state where the guide block is positioned close to the front of the vehicle relative to the guide rail by a distance of the gap, based on the assumption that the holding member is in an untightened state, fitting between the fitting portion and the attachment hole is released, and there is no margin of engagement between the rear edge portion of the attachment hole and the rear limited portion. As a result, it is possible to attach (or detach from) the guide block to the attachment hole while avoiding interference therebetween, (C) In the sunroof apparatus, a rib protrudes from the front limiting portion, and is in contact with the front limited portion while being squeezed.

In this configuration, since the rib is in contact with the front limited portion while being squeezed, the front limiting portion presses the front limited portion such that the guide block moves toward the rear of the vehicle, that is, such that a margin of engagement between the rear edge portion of the attachment hole and the rear limited portion is maximized. As a result, it is possible to more rigidly limit the movement of the guide block relative to the guide rail in the forward and rearward direction of the vehicle.

(D) In the sunroof apparatus, a pair of fitted pieces protruding toward each other are formed in the guide rail such that the opening width of the attachment hole in the width direction of the vehicle is reduced. A pair of fitting grooves are formed in the fitting portion such that both the fitting grooves respectively are in contact with or are proximate to both the fitted pieces in the width direction of the vehicle, and both the fitted pieces are respectively interposed in both the fitting grooves in the vertical direction of the vehicle.

In this configuration, since both the fitting grooves respectively are in contact with or are proximate to both the fitted pieces in the width direction of the vehicle, the movement of the guide block in the width direction is limited. Since both the fitted pieces are respectively interposed in both the fitting grooves in the vertical direction of the vehicle, the movement of the guide block in the vertical direction is limited.

As such, it is possible to more rigidly fix the guide block by limiting the movement of the guide block relative to the guide rail in the width direction and the vertical direction of the vehicle via fitting between both the fitted pieces and both the fitting grooves.

(E) In the sunroof apparatus, both the holding members are formed integrally with a front housing through which front end portions of both the guide rails are connected to each other in the width direction of the vehicle.

In this configuration, since both the holding members are formed integrally with the front housing, it is possible to prevent an increase in the number of components.

According to the aspect of this disclosure, it is possible to more rigidly fix a guide block.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A sunroof apparatus comprising:
   a movable panel adapted to open and close an opening formed in a roof of a vehicle:
   a guide rail that is provided in each edge portion of the opening in a width direction of the vehicle, extends in a forward and rearward direction, and includes a front end portion in which an attachment hole is formed in such a way as to open in a vertical direction of the vehicle;
   a guide block that is capable of limiting the movement of the movable panel in the forward direction of the vehicle, and includes a body portion mounted in a circumferential edge portion of the attachment hole, a rear limited portion which protrudes downward from a rear end portion of the body portion in the vertical direction of the vehicle, and interposes a rear edge portion of the attachment hole between the body portion and the rear limited portion in the vertical direction of the vehicle, and a front limited portion which protrudes downward from a front end portion of the body portion in the vertical direction of the vehicle, and is inserted into the attachment hole: and
   a holding member that is tightened to the guide rail, and includes a front limiting portion which is in contact with or is proximate to a vehicle front side of the front limited portion.

2. The sunroof apparatus according to claim 1, wherein a gap is formed between the attachment hole and the front limited portion in the forward and rearward direction of the vehicle such that the gap is equivalent to at least the range of a margin of engagement between the rear edge portion of the attachment hole and the rear limited portion, and
   wherein the guide block includes a fitting portion which limits the movement of the guide block relative to the guide rail in a limit direction other than the forward and rearward direction of the vehicle by being fitted into the attachment hole, and is capable of releasing fitting between the guide block and the attachment hole in a state where the fitting portion is positioned close to the front of the vehicle relative to the guide rail by a distance of the gap.

3. The sunroof apparatus according to claim 1, wherein a rib protrudes from the front limiting portion, and is in contact with the front limited portion while being squeezed.

4. The sunroof apparatus according to claim 2, wherein a pair of fitted pieces protruding toward each other are formed in the guide rail such that the opening width of the attachment hole in the width direction of the vehicle is reduced, and
   wherein a pair of fitting grooves are formed in the fitting portion such that both the fitting grooves respectively are in contact with or are proximate to both the fitted pieces in the width direction of the vehicle, and both the fitted pieces are respectively interposed in both the fitting grooves in the vertical direction of the vehicle.

5. The sunroof apparatus according to claim 1, wherein both the holding members are formed integrally with a front housing through which front end portions of both the guide rails are connected to each other in the width direction of the vehicle.

* * * * *